United States Patent
Lee et al.

(10) Patent No.: US 10,467,471 B2
(45) Date of Patent: Nov. 5, 2019

(54) ELECTRONIC DEVICE AND METHOD FOR AUTHENTICATING BIOMETRIC DATA THROUGH PLURAL CAMERAS

(71) Applicant: Samsung Electronics Co., Ltd., Gyeonggi-do (KR)

(72) Inventors: Wooyong Lee, Gyeonggi-do (KR); Myoungwon Kim, Gyeonggi-do (KR); Donghoon Jang, Gyeonggi-do (KR); Hyejin Kang, Gyeonggi-do (KR); Minsheok Choi, Gyeonggi-do (KR); Kihuk Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 31 days.

(21) Appl. No.: 15/935,480

(22) Filed: Mar. 26, 2018

(65) Prior Publication Data

US 2018/0276468 A1 Sep. 27, 2018

(30) Foreign Application Priority Data

Mar. 24, 2017 (KR) .......................... 10-2017-0037675

(51) Int. Cl.
*H04N 7/18* (2006.01)
*G06K 9/00* (2006.01)
(Continued)

(52) U.S. Cl.
CPC ......... *G06K 9/00617* (2013.01); *G06F 21/32* (2013.01); *G06K 9/00604* (2013.01); *G06K 9/00919* (2013.01); *G06K 9/228* (2013.01)

(58) Field of Classification Search
CPC .. H04N 7/18; G06K 9/00617; G06K 9/00604; G06K 9/00919; G06K 9/228; G06F 21/32
(Continued)

(56) References Cited

U.S. PATENT DOCUMENTS 6,920,236 B2 * 7/2005 Prokoski ............ G06K 9/00221
356/71
8,983,151 B2 * 3/2015 Park ..................... G06K 9/2027
382/118
(Continued)

FOREIGN PATENT DOCUMENTS

KR 10-2016-0036359 4/2016

OTHER PUBLICATIONS

International Search Report dated Jun. 14, 2018 issued in counterpart application No. PCT/KR2018/003513, 3 pages.

*Primary Examiner* — Trang U Tran
(74) *Attorney, Agent, or Firm* — The Farrell Law Firm, P.C.

(57) ABSTRACT

An electronic device and method of recognizing biometric data are provided. The electronic device includes a first camera configured to acquire an image through visible light; a second camera configured to acquire an image through infrared rays; a display; a memory; and a processor configured to receive a request associated with biometric authentication for a user, in response to the request, identify context information associated with the electronic device; when context information corresponds to a first condition, provide to the display a first image corresponding to the biometric authentication and acquired by the first camera, and perform the biometric authentication using biometric data acquired from the second camera; and when the context information corresponds to a second condition, provide to the display a second image corresponding to the biometric authentication and acquired by the second camera, and perform the biometric authentication using biometric data acquired from the second camera.

20 Claims, 12 Drawing Sheets

(51) Int. Cl.
*G06F 21/32* (2013.01)
*G06K 9/22* (2006.01)

(58) Field of Classification Search
USPC .............................. 348/77, 78; 382/115–118
See application file for complete search history.

(56) References Cited

U.S. PATENT DOCUMENTS

| | | | |
|---|---|---|---|
| 9,152,850 B2* | 10/2015 | Mogi | G06K 9/00288 |
| 10,013,609 B2* | 7/2018 | Ono | G06K 9/00255 |
| 2009/0245594 A1 | 10/2009 | Abramovich et al. | |
| 2013/0222564 A1 | 8/2013 | Park et al. | |
| 2015/0317464 A1 | 11/2015 | Willis et al. | |
| 2016/0092720 A1 | 3/2016 | Lee et al. | |
| 2016/0125221 A1 | 5/2016 | Kim et al. | |
| 2016/0171300 A1 | 6/2016 | Takemoto et al. | |
| 2017/0262693 A1* | 9/2017 | Aoki | G06K 9/00067 |

* cited by examiner

1. INTENSITY OF LIGHT INCIDENT ON FILTER FOR EACH COLOR: RED WAVELENGTH RANGE IS EXCESSIVELY INCIDENT

2. AMONG IMAGE DATA OF EACH COLOR, RED PIXEL DATA IS ATTENUATED

ELECTRONIC DEVICE AND METHOD FOR AUTHENTICATING BIOMETRIC DATA THROUGH PLURAL CAMERAS

CROSS-REFERENCE TO RELATED APPLICATION(S)

This application is based on and claims priority under 35 U.S.C. § 119 to Korean Patent Application No. 10-2017-0037675, filed on Mar. 24, 2017, in the Korean Intellectual Property Office, the disclosure of which is incorporated herein by reference.

BACKGROUND

1. Field

The present disclosure relates to an electronic device and method for authenticating biometric data by using a plurality of cameras and, more particularly, to an electronic device and method for identifying context information associated with the electronic device and provide a suitable image for the context information to a display.

2. Description of the Related Art

With remarkable growth of information communication technology and semiconductor technology, a great variety of electronic devices are becoming increasingly popular these days. Additionally, such electronic devices of today are outgrowing their respective traditional fields and hence have reached a stage of mobile convergence in which the fields of other types of devices are being incorporated. For example, electronic devices provide a camera function to capture and store an image of a subject or record images as video. In addition, some recent electronic devices have different kinds of two or more cameras to enhance user convenience.

An electronic device may use such cameras to recognize a user's biometric data and thereby guarantee security thereof. For example, an electronic device may recognize a user's iris data by using an infrared camera and, based on the iris data, authenticate the user.

An image acquired using an infrared camera that recognizes biometric data may be an achromatic image. For example, an image obtained using an infrared camera may show only a difference in temperature through white, black, and gray without accurately expressing the intrinsic colors of a user.

Providing an achromatic image through a display may distort the actual appearance of a user. Further, such an image is of poor quality; thus, this may cause a loss of usability because the image fails to satisfy a user's demand for high quality and high resolution images. In particular, displaying a user's biometric data based on infrared rays on a display of an electronic device may cause a problem of leakage and reproduction, so that it may be desirable to display a color image.

Accordingly, an image corresponding to biometric authentication may be provided to a display by using another camera capable of acquiring an image through visible light. However, a camera using visible light may be restricted in operation depending on a context. When an operation of a camera is restricted, an electronic device must selectively provide a suitable image for the context by, for example, displaying an image obtained from an infrared camera or certain biometric authentication guidance.

SUMMARY

An aspect of the present disclosure provides an electronic device that may identify context information associated with the electronic device and provide a suitable image for the context information to a display.

Another aspect of the present disclosure provides an electronic device that may prevent color distortion of a displayed user image due to a lighting module in a low illuminance environment.

According to another aspect of the present disclosure, depending on context information associated with an electronic device, the electronic device may provide a display with an image that corresponds to biometric authentication and is acquired by using at least one of a first camera capable of acquiring an image through visible light and a second camera capable of acquiring an image through infrared rays.

According to another aspect of the present disclosure, an electronic device may correct at least a portion of a color of the image to be provided, at least based on context information.

In accordance with an embodiment, an electronic device is provided. The electronic device includes a first camera configured to acquire an image through visible light; a second camera configured to acquire an image through infrared rays; a display; a memory; and a processor configured to receive a request associated with biometric authentication for a user, in response to the request, identify context information associated with the electronic device; when context information corresponds to a first condition, provide to the display a first image corresponding to the biometric authentication and acquired by the first camera, and perform the biometric authentication using biometric data acquired from the second camera; and when the context information corresponds to a second condition, provide to the display a second image corresponding to the biometric authentication and acquired by the second camera, and perform the biometric authentication using biometric data acquired from the second camera.

In accordance with another embodiment, a method of recognizing biometric data at an electronic device including a first camera configured to acquire an image through visible light and a second camera configured to acquire an image through infrared rays is provided. The method includes receiving a request associated with biometric authentication for a user; in response to the request, identifying context information associated with the electronic device; when the context information corresponds to a first condition, providing to a display of the electronic device a first image corresponding to the biometric authentication and acquired by the first camera, and performing the biometric authentication using biometric data acquired from the second camera; and when the context information corresponds to a second condition, providing to the display a second image corresponding to the biometric authentication and acquired by the second camera, and performing the biometric authentication using biometric data acquired from the second camera.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
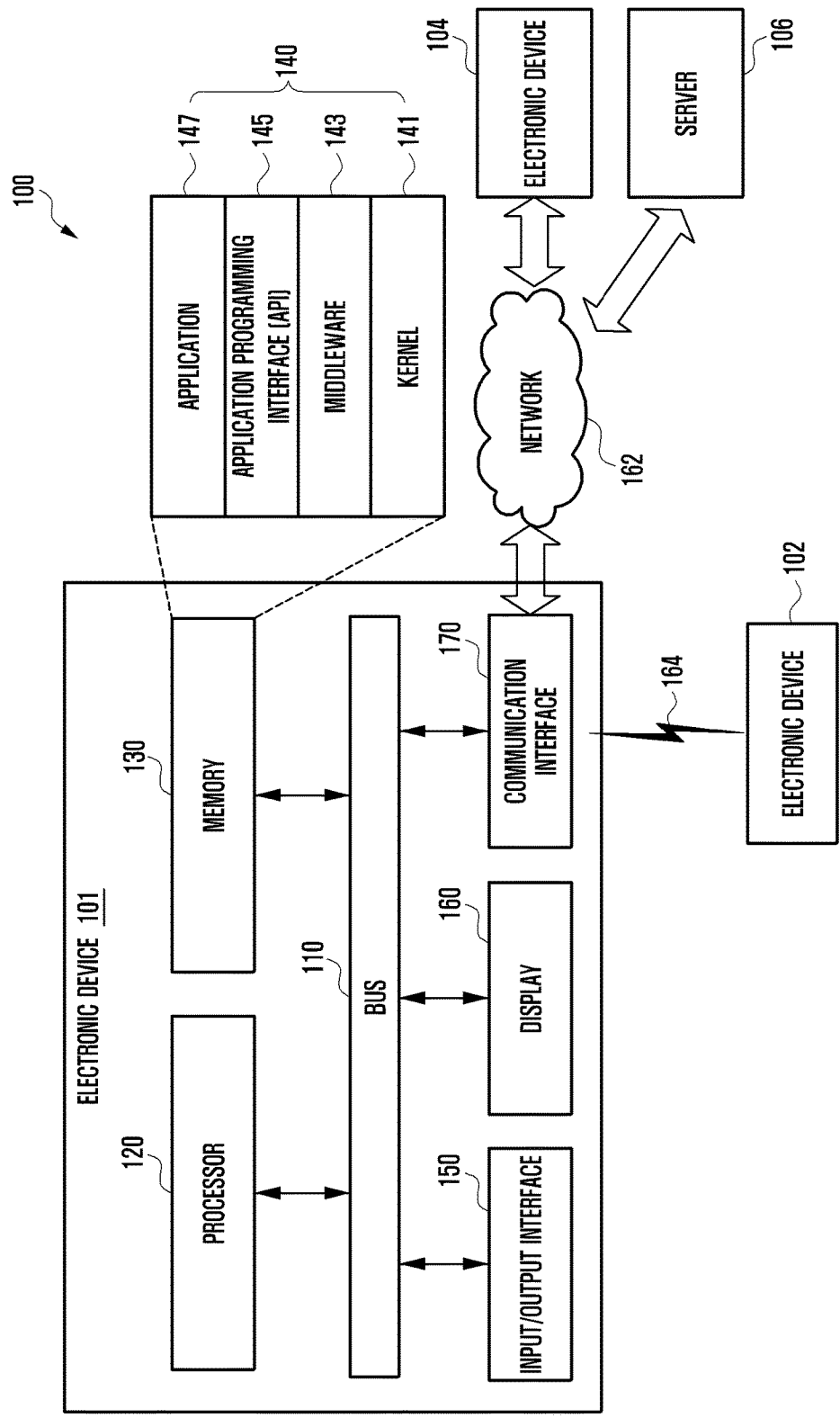
FIG. 1 is a block diagram of a network environment including an electronic device according to an embodiment.

Hereinafter, various embodiments of the present disclosure are described with reference to the accompanying drawings. However, it should be understood that there is no intent to limit the present disclosure to the particular forms disclosed herein; rather, the present disclosure is intended to be construed to cover various modifications, equivalents, and/or alternatives of the present disclosure. In the descriptions of the accompanying drawings, similar reference numerals may be used to designate similar elements.

As used herein, the expressions "have", "may have", "include", and "may include" refer to the existence of a corresponding feature (e.g., a numeral, a function, an operation, or an element such as a component), but do not exclude one or more additional features.

In the present disclosure, the expressions "A or B", "at least one of A and/or B", and "one or more of A and/or B" may include all possible combinations of the items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in the present disclosure may use various components regardless of order or importance and are used to distinguish a component from another without limiting the components. For example, a first user device and a second user device indicate different user devices but are both user devices. For example, a first element may be referred to as a second element, and similarly, a second element may be referred to as a first element without departing from the scope and spirit of the present disclosure.

It should be understood that when an element (e.g., a first element) is referred to as being (operatively or communicatively) "connected," or "coupled," to another element (e.g., a second element), the element may be directly connected or coupled to the other element or another element (e.g., a third element) may be interposer between them. In contrast, it may be understood that when an element (e.g., a first element) is referred to as being "directly connected," or "directly coupled" to another element (e.g., a second element), there is no element (e.g., a third element) interposed therebetween.

The expression "configured to" used in the present disclosure may be used interchangeably with, for example, the expressions "suitable for", "having the capacity to", "designed to", "adapted to", "made to", and "capable of" according to the situation. The expression "configured to" may not necessarily imply "specifically designed to" in hardware. Alternatively, in some situations, the expression "device configured to" may indicate that the device, together with other devices or components, "is able to". For example, the expression "processor adapted (or configured) to perform A, B, and C" may indicate a dedicated processor (e.g. an embedded processor) for performing only the corresponding operations or a general-purpose processor (e.g., a central processing unit (CPU) or an application processor (AP)) that may perform the corresponding operations by executing one or more software programs stored in a memory device.

The terms used in the present disclosure are only used to describe certain embodiments, but are not intended to limit the present disclosure. As used herein, singular forms may include plural forms as well unless the context clearly indicates otherwise. Unless defined otherwise, all terms used herein, have the same meanings as those terms commonly understood by a person skilled in the art to which the present disclosure pertains. Terms such as those defined in a generally used dictionary may be interpreted to have the same meanings as the contextual meanings in the relevant field of art, and are not intended to be interpreted to have ideal or excessively formal meanings unless clearly defined in the present disclosure. In some cases, even a term defined in the present disclosure may not be intended to be interpreted to exclude embodiments of the present disclosure.

In the present disclosure, an electronic device may be a device that includes a communication function. For example, an electronic device may be a smart phone, a tablet personal computer (PC), a mobile phone, a video phone, an electronic (e-book) reader, a desktop PC, a laptop PC, a netbook computer, a personal digital assistant (PDA), a portable multimedia player (PMP), a moving picture experts group (MPEG) audio layer 3 (MP3) player, a portable medical device, a digital camera, or a wearable device (e.g., a head-mounted device (HMD) such as electronic glasses, electronic clothes, an electronic bracelet, an electronic necklace, an electronic accessory, an electronic tattoo, a smart mirror, or a smart watch).

According to an embodiment, an electronic device may be a smart home appliance that includes a communication function. For example, an electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV™, etc.), a game console, an electronic dictionary, an electronic key, a camcorder, or an electronic picture frame.

According to an embodiment, an electronic device may include at least one of various medical devices (e.g., various portable medical measuring devices (e.g., a blood glucose monitoring device, a heart rate monitoring device, a blood pressure measuring device, a thermometer, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) devices in a shop, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.)

According to an embodiment, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to an embodiment is described with reference to the accompanying drawings. As used herein, the term "user" may indicate a person who uses an electronic device or a device (e.g., an artificial intelligence electronic device) that uses an electronic device.

FIG. 1 is a block diagram of a network environment 100 including an electronic device 101 according to an embodiment.

Referring to FIG. 1, the electronic device 101, in the network environment 100, includes a bus 110, a processor 120, a memory 130, an input/output interface 150, a display 160, and a communication interface 170. The electronic device 101 may omit at least one of the components or further include another component.

The bus 110 may be a circuit connecting the above described components and transmitting communication (e.g., a control message) between the above described components.

The processor 120 may include one or more of a CPU, an AP and a communication processor (CP). For example, the processor 120 may control at least one component of the electronic device 101 and/or perform a calculation relating to communication or data processing.

The memory 130 may include volatile and/or non-volatile memory. For example, the memory 130 may store a command or data relating to at least one component of the electronic device 101. According to an embodiment, the memory may store software and/or a program 140. For example, the program 140 may include a kernel 141, middleware 143, an application programming interface (API) 145, and/or an application 147 and so on. At least one portion of the kernel 141, the middleware 143 and the API 145 may be defined as an operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function for allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 142 and includes, for example, at least one interface or function (e.g., a command) for a file control, a window control, image processing, or a character control.

The input/output interface 150 may be an interface to transmit a command or data inputted by a user or another external device to another component(s) of the electronic device 101. Further, the input/output interface 150 may output a command or data received from another component(s) of the electronic device 101 to the user or another external device.

The display 160 may include, for example, a liquid crystal display (LCD), a light emitting diode (LED), an organic LED (OLED), a micro electro mechanical system (MEMS) display, or an electronic paper display. The display 160 may display, for example, various contents (e.g., text, an image, video, an icon, a symbol, and so on) to a user. The display 160 may include a touch screen, and receive a touch input, a gesture input, an approaching input, or a hovering input using a part of a user's body.

The communication interface 170 may establish communication between the electronic device 101 and an external device (e.g., a first external device 102, a second external device 104, or a server 106). For example, the communication interface 170 may be connected to a network 162 through wireless communication or wire communication and communicate with the second external device 104 or the server 106.

Wireless communication may use, as a cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and the like, for example. A short-range communication 164 may include, for example, at least one of wireless fidelity (WiFi), Bluetooth (BT), near field communication (NFC), and global navigation satellite system (GNSS), and the like.

The GNSS may include at least one of, for example, GPS, a global navigation satellite system (Glonass), a Beidou navigation satellite system (Beidou), and European global satellite-based navigation system (Galileo). Hereinafter, "GPS" may be interchangeably used with "GNSS". Wired communication may include, for example, at least one of a universal serial bus (USB), a high definition multimedia interface (HDMI), recommended standard-232 (RS-232), a plain old telephone service (POTS), and the like. The network 162 may include a telecommunication network, for example, at least one of a computer network (e.g., a local area network (LAN) or a wide area network (WAN)), the internet, and a telephone network.

Each of the first external device 102 and the second external device 104 may be the same or a different type of device than the electronic device 101. According to an embodiment of the present disclosure, the server 106 may include one or more group of servers. At least one portion of executions executed by the electronic device 101 may be performed by one or more of the first external device 102, the second external device 104, or server 106. If the electronic device 101 performs a function or service automatically, the electronic device 101 may request that at least one function be performed by the first external device 102, the second external device 104, or the server 106. For the above, cloud computing technology, distributed computing technology, or client-server computing technology may be used, for example.

Figure 2:
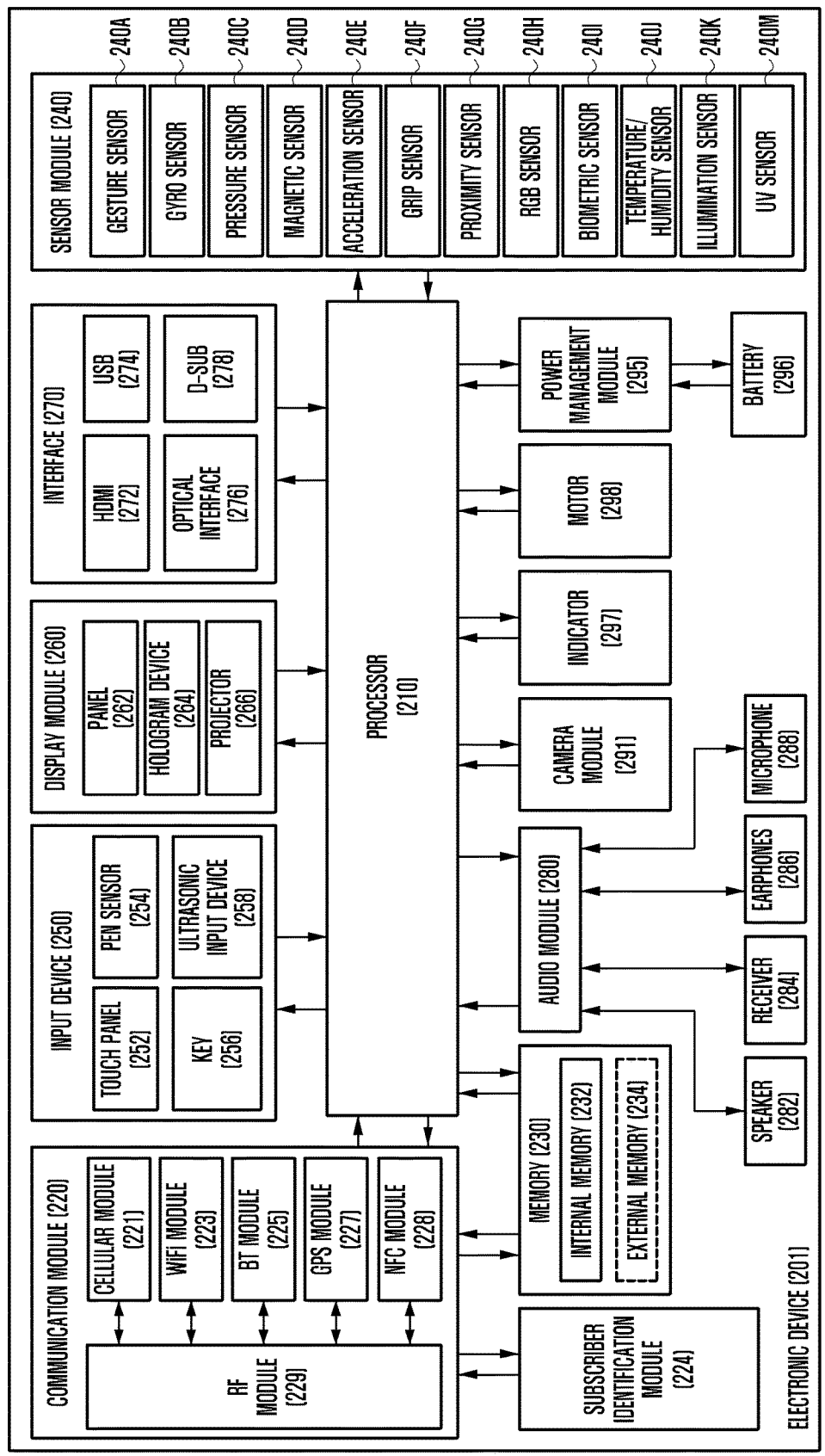
FIG. 2 is a block diagram of an electronic device according to an embodiment.

FIG. 2 is a block diagram of an electronic device 201 according to an embodiment.

Referring to FIG. 2, the electronic device 201 may configure, for example, a whole or a part of the electronic device 101 illustrated in FIG. 1. The electronic device 201 includes one or more processor (e.g. an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The AP 210 operates an OS or an application program so as to control a plurality of hardware or software component elements connected to the AP 210 and executes various data processing and calculations including multimedia data. The AP 210 may be implemented by, for example, a system on chip (SoC). According to an embodiment of the present disclosure, the AP 210 may further include a graphics processing unit (GPU) and/or an image signal processor (ISP). The AP 210 may include at least one portion of the components illustrated in FIG. 2 (e.g., a cellular module 221). The AP 210 may load a command or data received from at least one other component (e.g., a non-volatile memory), and store various data in the non-volatile memory.

The communication module 220 may include same or similar components as the communication interface 170 of FIG. 1. The communication module 220, for example, may include the cellular module 221, a WiFi module 223, a BT module 225, a GPS module 227, an NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using the SIM 224. According to an embodiment, the cellular module 221 performs at least some of the functions which may be provided by the AP 210. For example, the cellular module 221 may perform at least some multimedia control functions. The cellular module 221 may include a CP.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are at least some (e.g., two or more) of the cellular module 221, the WiFi module 223, the BT module 225, the GPS module 227, and the NFC module 228 may be included in one integrated circuit (IC) or one IC package. For example, at least some (e.g., a CP corresponding to the cellular module 221 and a WiFi processor corresponding to the WiFi module 222) of the processors corresponding to the cellular module 221, the WiFi module 223, the BT module 225, the GPS module 227, and the NFC module 228 may be implemented by one SoC.

The RF module 229 transmits/receives data, for example, an RF signal. The RF module 229 may include, for example, a transceiver, a power amplifier module (PAM), a frequency filter, a low noise amplifier (LNA) and the like. Further, the RF module 229 may further include a component for transmitting/receiving electronic waves over a free air space in a wireless communication, for example, a conductor, a conductive wire, and the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM 224 may be inserted into a slot formed in a certain portion of the electronic device 201. The SIM 224 includes unique identification information (e.g., an integrated circuit card identifier (ICCID)) or subscriber information (e.g., an international mobile subscriber identity (IMSI)).

The memory 230 (e.g., the memory 130 illustrated in FIG. 1) may include an internal memory 232 or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile memory (e.g., a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a not-and (NAND) flash memory, a not-or (NOR) flash memory, and the like).

According to an embodiment, the internal memory 232 may be a solid state drive (SSD). The external memory 234 may further include a flash drive, for example, a compact flash (CF) drive, a secure digital (SD) card, a micro-SD card, a mini-SD card, an extreme digital (xD) card, or a memory stick. The external memory 234 may be functionally connected to the electronic device 201 through various interfaces. The electronic device 201 may further include a storage device (or storage medium) such as a hard drive.

The sensor module 240 measures a physical quantity or detects an operational state of the electronic device 201, and converts the measured or detected information to an electrical signal. The sensor module 240 may include, for example, at least one of a gesture sensor 240A, a gyro sensor 240B, a pressure (barometric or atmospheric) sensor 240C, a magnetic sensor 240D, an acceleration sensor 240E, a grip sensor 240F, a proximity sensor 240G, a color sensor 240H (e.g., a red, green, and blue (RGB) sensor) 240H, a biometric sensor 240I, a temperature/humidity sensor 240J, an illumination (e.g., light) sensor 240K, and a ultraviolet (UV) light sensor 240M. Additionally or alternatively, the sensor module 240 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one of a capacitive type touch panel, a resistive type touch panel, an infrared type touch panel, and an acoustic wave type touch panel. The touch panel 252 may further include a control circuit. In a capacitive type touch panel, the touch panel 252 may recognize a proximity touch as well as a direct touch. The touch panel 252 may further include a tactile layer. In this case, the touch panel 252 provides a tactile reaction to a user.

The (digital) pen sensor 254 may be implemented, for example, using a method identical or similar to a method of receiving a touch input of a user, or using a separate recognition sheet. The key 256 may include, for example, a physical button, an optical key, or a key pad. The ultrasonic input device 258 is a device which may detect an acoustic wave by a microphone 288 of the electronic device 201 through an input means generating an ultrasonic signal to identify data and may perform wireless recognition. According to an embodiment, the electronic device 201 receives a user input from an external device (e.g., a computer or a server) connected to the electronic device 201 by using the communication module 220.

The display 260 includes a panel 262, a hologram device 264, and a projector 266. The panel 262 may be, for example, an LCD or an active matrix OLED (AM-OLED). The panel 262 may be implemented to be, for example, flexible, transparent, or wearable. The panel 262 may be configured by the touch panel 252 and one module. The hologram device 264 provides a stereoscopic image in the air by using the interference of light. The projector 266 projects light onto a screen to display an image. For example, a screen may be located inside or outside of the electronic device 201. According to an embodiment, the display 260 may further include a control circuit for controlling the panel 262, the hologram device 264, and the projector 266.

The interface 270 includes, for example, an HDMI 272, a USB 274, an optical interface 276, and a D-subminiature (D-sub) connector 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC), or an Infrared Data Association (IrDA) standard interface.

The audio module 280 bi-directionally converts a sound and an electrical signal. At least some components of the audio module 280 may be included in, for example, the input/output interface 150 illustrated in FIG. 1. The audio module 280 processes sound information input or output through, for example, a speaker 282, a receiver 284, earphones 286, the microphone 288, and the like.

The camera module 291 is a device which may photograph a still image and record a video. According to an embodiment, the camera module 291 may include one or more image sensors (e.g., a front sensor or a back sensor), an ISP or a flash (e.g., an LED or xenon lamp).

The power management module 295 manages power of the electronic device 201. The power management module 295 may include, for example, a power management integrated circuit (PMIC), a charger IC, or a battery gauge.

The PMIC may be mounted, for example, in an IC or an SoC. A charging method may be divided into wired and wireless methods. A charger IC charges a battery and prevents an over voltage or an over current from flowing from a charger. According to an embodiment of the present disclosure, a charger IC includes a charger IC for at least one of a wired charging method and a wireless charging method. A wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

A battery gauge measures, for example, a remaining quantity of the battery 296, a voltage, a current, or a temperature during charging. The battery 296 may store or generate electricity and supply power to the electronic device 201 by using the stored or generated electricity. The battery 296 may include a rechargeable battery or a solar battery.

The indicator 297 shows certain statuses of the electronic device 201 or a part (e.g., the AP 210) of the electronic device 201, for example, a booting status, a message status, a charging status and the like. The motor 298 converts an electrical signal to a mechanical vibration. The electronic device 201 may include a processing unit (e.g., a GPU) for supporting a mobile TV. The processing unit for supporting a mobile TV may process, for example, media data according to a standard of digital multimedia broadcasting (DMB), digital video broadcasting (DVB), MediaFlo™ and the like.

Each of the components of the electronic device 201 according to an embodiment of the present disclosure may be implemented by one or more components and the name of the corresponding component may vary depending on a type of the electronic device. The electronic device 201 may include at least one of the above described components, a few of the components may be omitted, or additional components may be further included. In addition, some of the components of the electronic device 201 may be combined to form a single entity, and thus may equivalently execute functions of the corresponding components before being combined.

Figure 3:
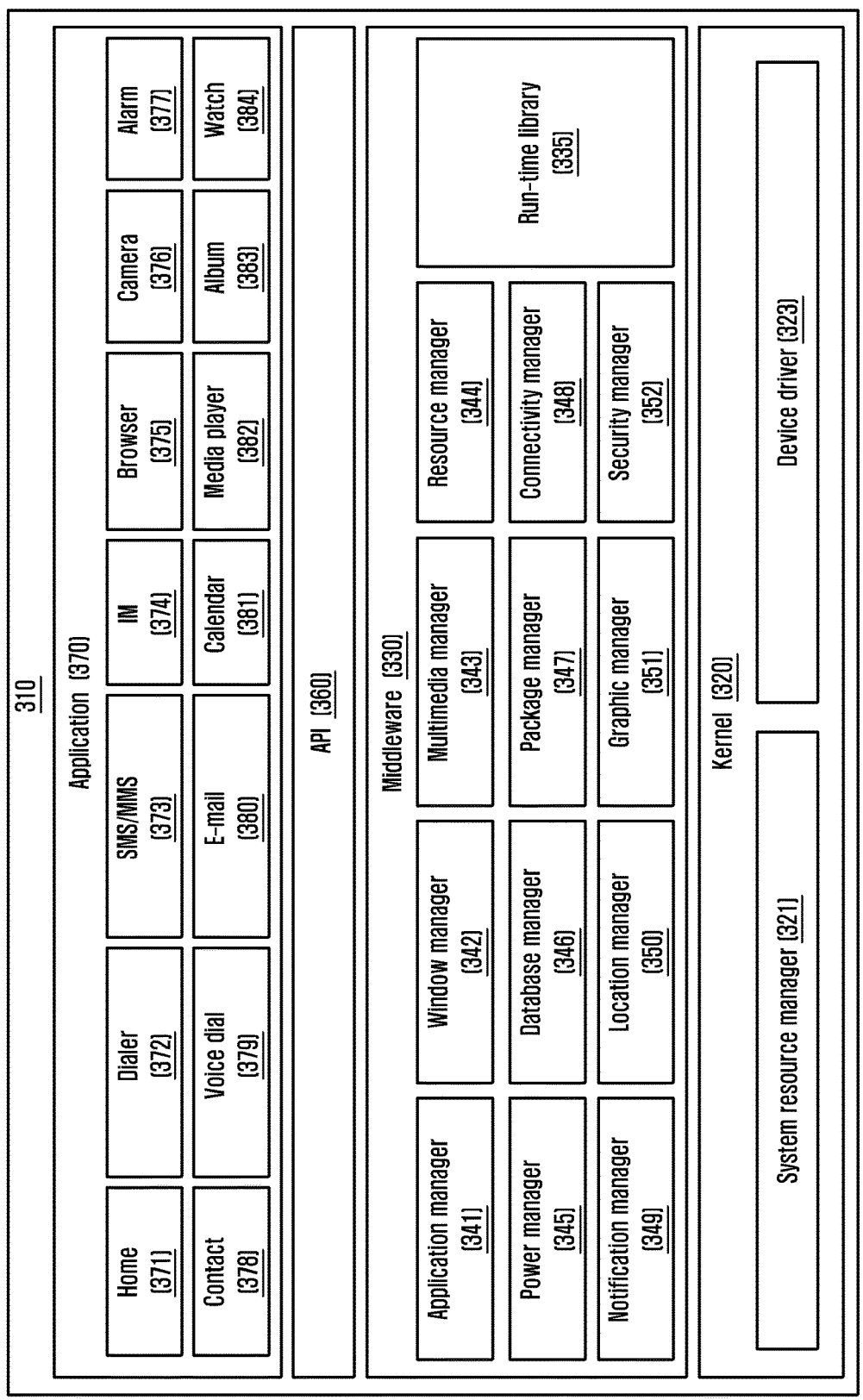
FIG. 3 is a block diagram of a program module according to an embodiment.

FIG. 3 is a block diagram of a programming module 310 according to an embodiment.

Referring to FIG. 3, the programming module 310 may be included or stored, in the electronic apparatus 101, e.g., in the memory 130, as illustrated in FIG. 1. At least a part of the programming module 310 may be configured by software, firmware, hardware, and/or combinations of two or more thereof. The programming module 310 may include an OS that is implemented in hardware, e.g., the hardware 200 to control resources related to an electronic device 100, and/or various applications 370, driven on the OS. For example, the OS may be Android®, iOS®, Windows®, Symbian®, Tizen®, Bada™, and the like. The programming module 310 may include a kernel 320, middleware 330, an API 360, and an application 370. At least part of the program module 310 may be preloaded on the electronic device or downloaded from the first external device 102, the second external device 104, or the server 106, etc.

The kernel 320 may include a system resource manager 321 and/or a device driver 323. The system resource manager 321 may include, for example, a process manager, a memory manager, and a file system manager. The system resource manager 321 may control, allocate, and/or collect system resources. The device driver 323 may include, for example, a display driver, a camera driver, a BT driver, a shared memory driver, a USB driver, a keypad driver, a WiFi driver, and an audio driver. Further, according to an embodiment, the device driver 323 may include an inter-process communication (IPC) driver.

The middleware 330 may include a plurality of modules implemented in advance for providing functions commonly used by the application 370. Further, the middleware 330 may provide the functions through the API 360 such that the application 370 may efficiently use restricted system resources within an electronic apparatus. For example, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as source code, a memory, and a storage space of at least one of the applications 370.

The power manager 345 may manage a battery and/or power, while operating together with a basic input/output system (BIOS), and may provide power information used for an operation. The database manager 346 may manage the generation, a search of, and/or a change of a database to be used by at least one of the applications 370. The package manager 347 may manage the installation and/or an update of an application distributed in a form of a package file.

The connectivity manager 348 may manage wireless connectivity such as WiFi or BT. The notification manager 349 may display and/or notify of an event, such as an arrival message, a promise, a proximity notification, and the like, in such a way that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment of the present disclosure, if an electronic apparatus 100, has a telephone call function, the middleware 330 may further include a telephony manager for managing a voice and/or video communication function of the electronic apparatus. A payment manger is capable of relaying payment information from the application 370 to an application 370 or a kernel 320. Alternatively, the payment manager is capable of storing payment-related information received from an external device in the electronic device 200 or transmitting information stored in the electronic device 200 to an external device.

The middleware 330 may generate and use a new middleware module through various functional combinations of the aforementioned internal element modules. The middleware 330 may provide modules specialized according to types of OSs in order to provide differentiated functions. Further, the middleware 330 may dynamically remove some of the existing elements and/or add new elements. Accordingly, the middleware 330 may exclude some of the elements described in various embodiments, further include other elements, and/or substitute the elements with elements having a different name but performing a similar function.

The API 360 is a set of API programming functions, and may be provided with a different configuration according to an OS. For example, in a case of Android® or iOS®, one API set may be provided for each OS platform, and in a case of Tizen®, two or more API sets may be provided.

The application 370 may include, for example, a preloaded application and/or a third party application. The application 370 may include one or more of a home application 371 a dialer application 372, an SMS/multimedia messaging service (MMS) application 373, an instant messaging (IM) application 374, a browser application 375, a camera application 376, an alarm application 377, a contact application 378, a voice dial application 379, an email application 380, a calendar application 381, a media player application 382, an album application 383, a watch application 384, a payment application, a health care application (e.g., an application for measuring blood pressure, exercise intensity, etc.), an application for providing environmental information (e.g., atmospheric pressure, humidity, temperature, etc.), etc. However, the present embodiment is not limited thereto, and the application 370 may include any other similar and/or suitable application.

According to an embodiment of the present disclosure, the application 370 is capable of including an application for supporting information exchange between the electronic device 101 and the first external device 102 and the second external device 104 (e.g., an information exchange application). The information exchange application is capable of including a notification relay application for relaying certain information to external devices or a device management application for managing external devices.

For example, the notification relay application is capable of including a function for relaying notification information created in other applications of the electronic device (e.g., the SMS/MMS application 373, the email application 380, the health care application, the environmental information application, etc.) to the first external device 102 and the second external device 104. In addition, the notification relay application is capable of receiving notification information from external devices to provide the received information to a user.

The device management application is capable of managing (e.g., installing, removing or updating) at least one function of an external device (e.g., the first external device 102 and the second external device 104) communicating with the electronic device. Examples of the function are a function of turning-on/off an external device or part of an external device, a function of controlling the brightness (or resolution) of a display, applications running on an external device, and services provided by an external device, etc. Examples of the services are a call service, messaging service, etc.

According to an embodiment, the application 370 is capable of including an application (e.g., a health care application of a mobile medical device, etc.) and specified attributes of the first external device 102 and the second external device 104. The application 370 is capable of including applications received from the server 106, the first external 102 and the second external 104. The applications 370 are capable of including a preloaded application or third party applications that may be downloaded from a server. It should be understood that the components of the program module 310 may be referred to with different names according to the types of operating systems.

According to an embodiment, at least part of the program module 310 may be implemented with software, firmware, hardware, or any combination of two or more of them. At least part of the program module 310 may be implemented (e.g., executed) by a processor 210. At least part of the programming module 310 may include modules, programs, routines, sets of instructions or processes, etc., in order to perform one or more functions.

In the present disclosure, the term "module" refers to a unit including hardware, software, firmware or a combination thereof. For example, the term "module" is interchangeable with the terms "unit," "logic," "logical block," "component," "circuit," or the like. The term "module" may indicate the smallest unit or a part of an integrated component. The term "module" may indicate the smallest unit or a part thereof that may perform one or more functions. The term "module" may indicate a unit that may be implemented in mechanical or electronic mode. For example, the term "module" may indicate a unit that includes at least one of an application specific integrated circuit (ASIC), a field-programmable gate array (FPGA) and a programmable-logic device that may perform functions that are known or will be developed.

At least part of the method (e.g., operations) or devices (e.g., modules or functions) according to various embodiments may be implemented with instructions that may be conducted via various types of computers and stored in non-transitory computer-readable storage media, as types of programming modules, for example. One or more processors 120 may execute command instructions, thereby performing the functions. An example of the non-transitory computer-readable storage media may be the memory 130.

Examples of non-transitory computer-readable storage media include magnetic media, such as hard disks, floppy disks, and magnetic tape; optical media such as compact disc ROM (CD-ROM) disks and DVDs; magneto-optical media, such as floptical disks; and hardware devices such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules to perform the operations of various embodiments described above, or vice versa.

Modules or programming modules according to various embodiments may include one or more components, remove part of them described above, or further include new components. The operations performed by modules, programming modules, or other components, may be executed in serial, parallel, repetitive or heuristic fashion. Part of the operations may be executed in any other order, skipped, or executed with additional operations.

Figure 4:
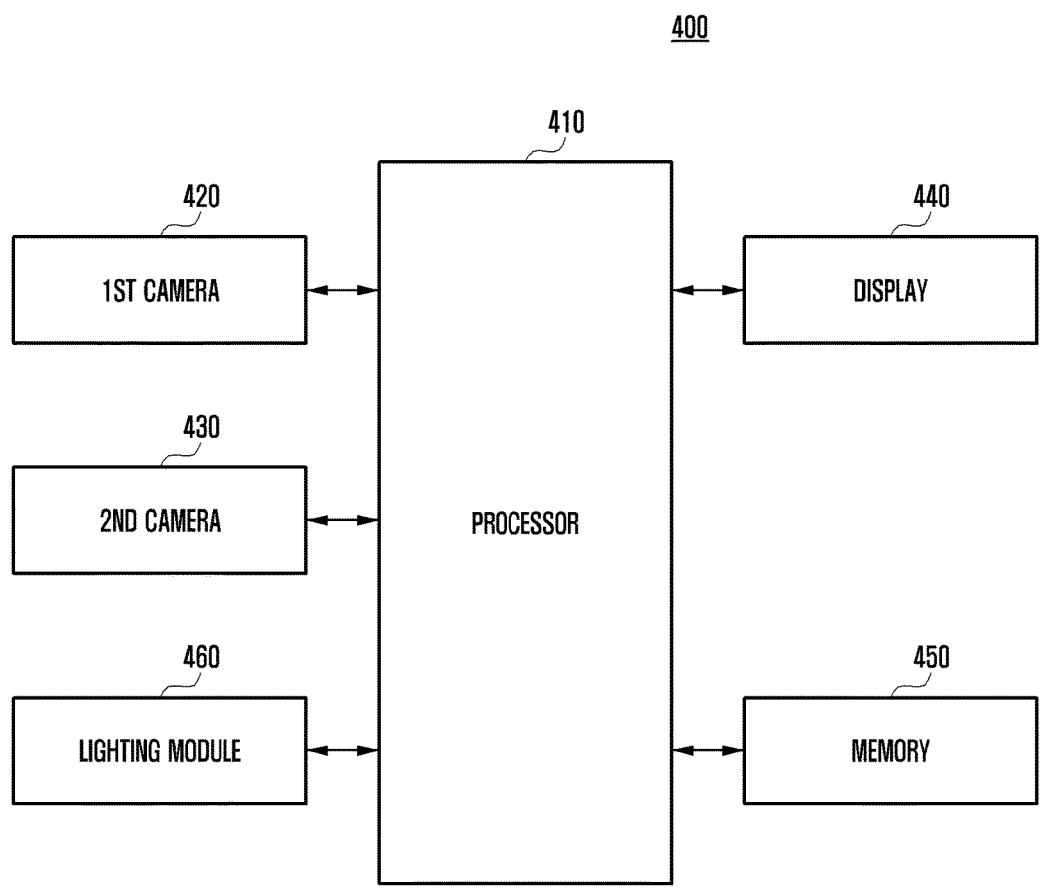
FIG. 4 is a block diagram of an electronic device according to an embodiment.

FIG. 4 is a block diagram of an electronic device 400 according to an embodiment.

Referring to FIG. 4, the electronic device 400 (e.g., the electronic device 101 in FIG. 1 or the electronic device 201 in FIG. 2) may include a processor 410 (e.g., the processor 120 in FIG. 1 or the processor 210 in FIG. 2), a first camera 420, a second camera 430, a display 440 (e.g., the display 160 in FIG. 1 or the display 260 in FIG. 2), a memory 450 (e.g., the memory 130 in FIG. 1 or the memory 230 in FIG. 2), and an lighting module 460. In an embodiment, the electronic device 400 may omit at least one of the above-listed elements or further include another element.

The processor 410 may instruct other elements (e.g., the first camera 420, the second camera 430, the display 440, the memory 450, and the lighting module 460) to operate. In addition, the processor 410 may receive instructions from the other elements, decode the received instructions, and perform operations or data processing in accordance with the decoded instructions. In an embodiment, the processor 410 may process an image signal to a suitable form for being displayed on the display 440. The processor 410 may include one or more of an image processor, a camera driver, and an application processor. Although FIG. 4 shows that one processor 410 controls the operations of all elements, at least two processors 410 may control different elements and process separate tasks in an embodiment.

The first camera 420 may be a device that acquires an image by using visible light. According to an embodiment, the first camera 420 may include an image sensor such as a complementary metal oxide semiconductor (CMOS) sensor or a charge coupled device (CCD) sensor. The first camera 420 may generate a first image corresponding to biometric authentication, based on the image sensor. The first image may be a raw image having only information about the intensity of light detected by an imaging medium. The first image may be a full-resolution image detected by the first camera 420.

The second camera 430 may be a device that acquires an image by using infrared rays. The second camera 430 may include an infrared image sensor and a band pass filter. The infrared image sensor may detect a captured image and convert it into an electrical signal. The second camera 430 may generate a second image corresponding to biometric authentication, based on the infrared image sensor. The second image may be a raw image having only information about the intensity of light detected by the imaging medium. The second image may be a full-resolution image detected by the infrared image sensor.

The display 440 may display thereon various kinds of information (e.g., multimedia data, text data, and the like). The display 440 may include a panel, a hologram device, and/or a projector. The panel may include, for example, an LCD or an AM-OLED. The panel may be implemented to be, for example, flexible, transparent, or wearable. The panel may include a touch panel and one or more modules. The hologram device may display a stereoscopic image in the air by using the interference of light. The projector may display an image by projecting light onto a screen. The screen may be located, for example, inside or outside the electronic device 400. According to an embodiment, the display 440 may display a first image corresponding to the biometric authentication and acquired by the first camera 420, or a second image corresponding to the biometric authentication and acquired by the second camera 430.

The memory 450 may store, for example, images taken by the first camera 420 and/or the second camera 430 as image files or video files. In addition, the memory 450 may previously store iris feature data authenticated for iris recognition. According to an embodiment, the memory 450 may store instructions that cause, in execution, the processor 410 to receive a request associated with biometric authentication for a user; identify context information associated with the electronic device 400 in response to the request; when the context information corresponds to a first condition, provide to the display 440 a first image corresponding to the biometric authentication and acquired by the first camera 420, and perform the biometric authentication using biometric data acquired from the second camera 430; and when the context information corresponds to a second condition, provide to the display 440 a second image corresponding to the biometric authentication and acquired by the second camera 430, and perform the biometric authentication using biometric data acquired from the second camera 430.

The lighting module 460 may emit light of a certain wavelength range. For example, the lighting module 460 may emit light having a wavelength range of 850 to 950 nm. In an embodiment, the lighting module 460 may include a band pass filter that filters light of a certain wavelength range to prevent an incorrect operation due to ambient light of infrared wavelength ranges. The lighting module 460 may emit light in pulses in synchronization with an input frame of the infrared image sensor or may emit light in a continuous wave.

Figure 5:
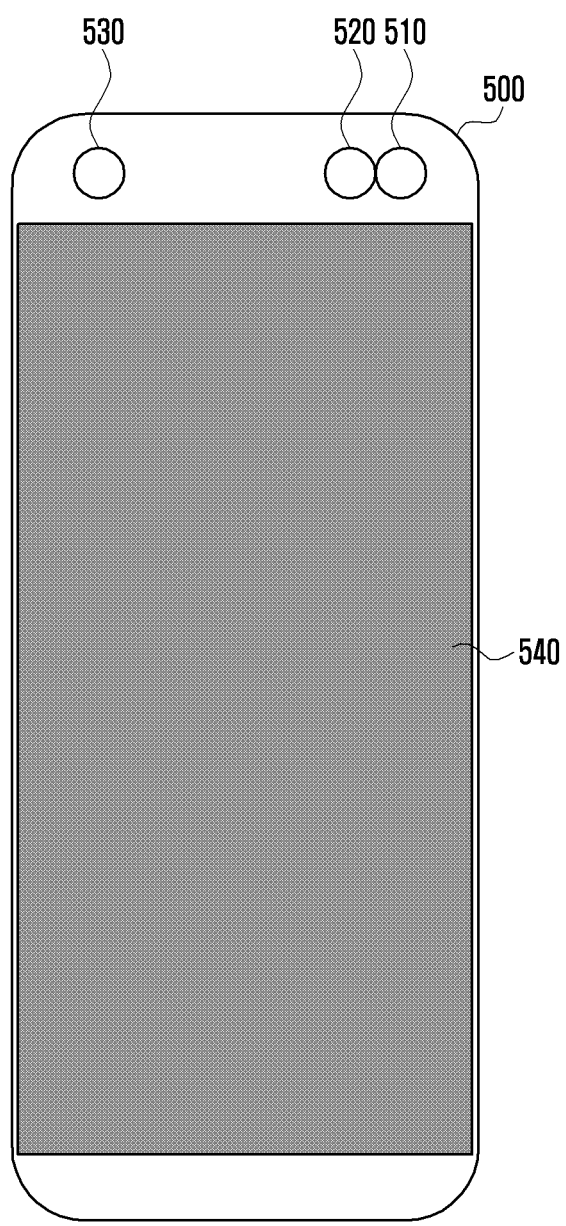
FIG. 5 is an illustration of an electronic device according to an embodiment.

FIG. 5 is an illustration of an electronic device 500 according to an embodiment.

Referring to FIG. 5, the electronic device 500 may include various electronic components therein and a housing for protecting the components. The housing may form an appearance of the electronic device 500 including, for example, a front face, a rear face opposite the front face, and lateral faces surrounding a space formed between the front and rear faces. At least a portion of the front face of the housing may be formed of a display 540. In an embodiment, the display 540 may be extended to the lateral face of the housing.

According to an embodiment, the electronic device 500 may include a first camera 510 for acquiring an image by using visible light, and a second camera 520 for acquiring an image by using infrared light. The first and second cameras 510 and 520 may be formed such that a lens thereof is mounted in the same direction as a direction toward which the display 540 faces. The first and second cameras 510 and 520 may be disposed to be adjacent to each other so as to acquire first and second images, respectively, that correspond to biometric authentication.

According to an embodiment, the first and second cameras 510 and 520 may have different focal lengths and/or different angles of view. For example, the first camera 510 may have a first angle of view, and the second camera 520 may have a second angle of view different from the first angle of view. For example, the first camera 510 may have a wide angle lens, and the second camera 520 may have a telephoto lens.

According to an embodiment, the electronic device 500 may include a lighting module 530 that emits light of a particular wavelength range. The lighting module 530 may be configured to emit light in the same direction as the lens direction of the second camera 520. The lighting module 530 may be omitted as needed.

Figure 6:
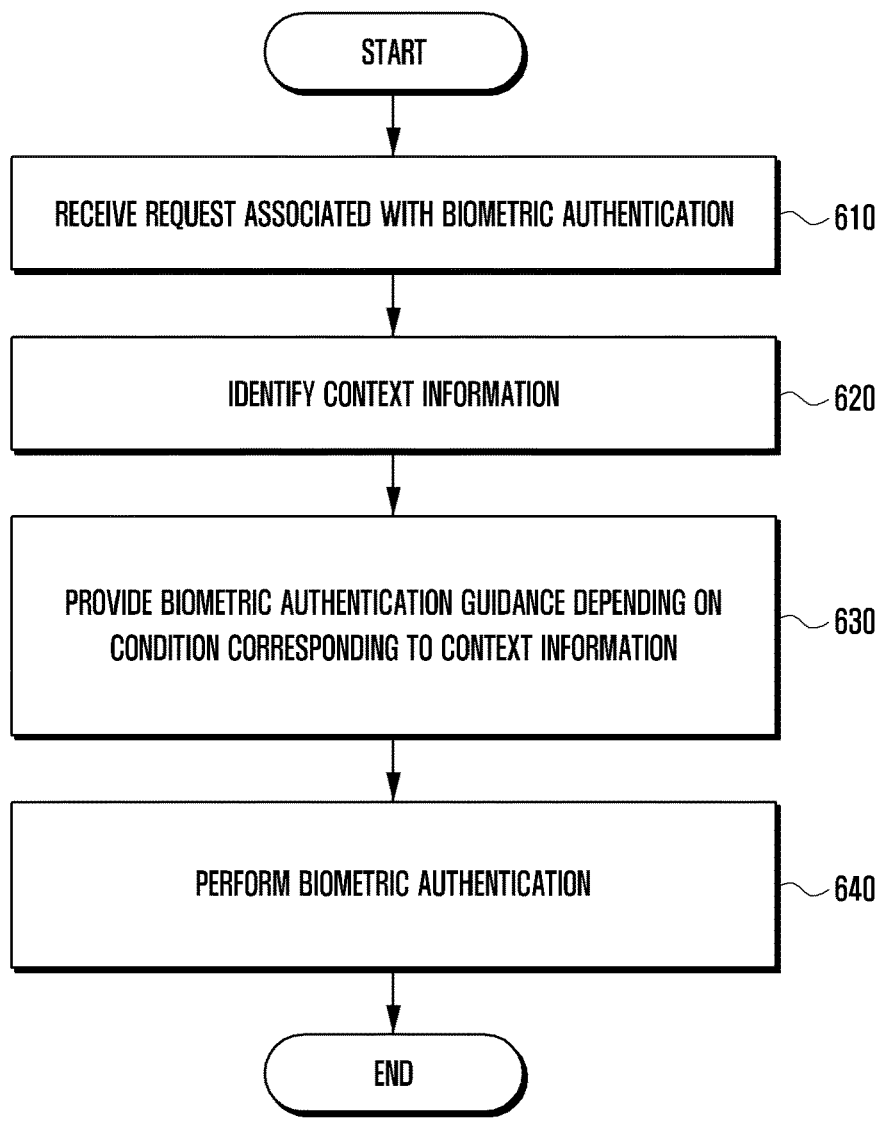
FIG. 6 is a flowchart of a method of recognizing biometric data according to an embodiment.

FIG. 6 is a flowchart of a method of recognizing biometric data according to an embodiment.

Referring to FIG. 6, at step 610, the processor 410 of the electronic device 400 may receive a request associated with biometric authentication for a user.

The biometric authentication for the user may refer to a procedure of authenticating the user by using the user's biometric data such as iris, fingerprint, vein, face, voice, or gait.

The request associated with the biometric authentication for the user may be received from the user or another external electronic device. In an embodiment, the request associated with the biometric authentication for the user may be triggered by a particular application running in the electronic device 400 or by an operation policy for controlling the operation of the electronic device 400.

At step 620, the processor 410 of the electronic device 400 may identify context information associated with the electronic device 400 in response to the request.

The context information associated with the electronic device 400 may include, for example, at least one of an ambient environment of the electronic device 400, an operation policy of the electronic device 400, and a status of the electronic device 400.

According to an embodiment, the processor 410 of the electronic device 400 may check the illuminance around the electronic device 400 to identify the ambient environment of the electronic device 400. For example, the processor 410 may check the illuminance around the electronic device 400 by using an illuminance sensor. The processor 410 may check the illuminance around the electronic device 400 through a process of acquiring image data from at least one camera and analyzing the acquired image data.

According to an embodiment, the processor 410 of the electronic device 400 may determine whether the use of a camera is allowed according to the operation policy (e.g., a security policy). For example, the processor 410 may check whether the operation policy allows, in a current state, the use of the first camera 420 capable of acquiring an image by using visible light and/or the use of the second camera 430 capable of acquiring an image by using infrared rays.

According to an embodiment, the processor 410 of the electronic device 400 may identify the status of the electronic device 400. For example, the processor 410 may check a display mode of a displayed screen or check a positional state of the electronic device 400 by using at least one sensor. For example, the processor 410 may check a direction and/or a moving state of the electronic device 400 by using at least one of an acceleration sensor and a gyro sensor.

At step 630, the processor 410 of the electronic device 400 may identify a condition corresponding to the context information and then provide through the display 440 biometric authentication guidance based on the identified condition.

Figure 7:
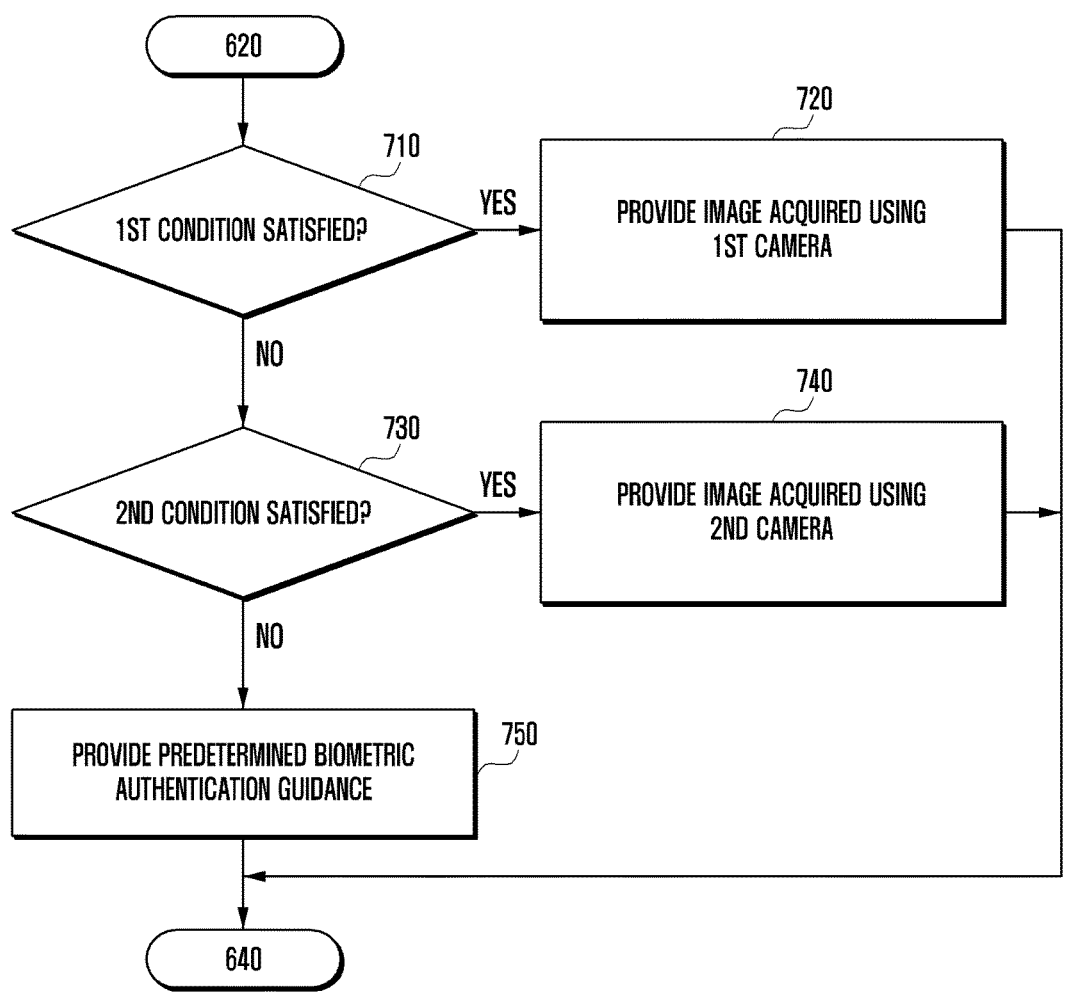
FIG. 7 is a flowchart of a method of an operation in FIG. 6 according to an embodiment.

FIG. 7 is a flowchart of a method of step 630 shown in FIG. 6.

Referring to FIG. 7, at step 710, the processor 410 of the electronic device 400 may determine whether the context information corresponds to a first condition. The first condition may include at least one of a condition that the illuminance around the electronic device 400 satisfies a first range (e.g., a value obtained through the illuminance sensor exceeds a predetermined threshold), a condition that the use of the first camera 420 is allowed according to the operation policy of the electronic device 400, and a condition that the display mode of the electronic device 400 is a portrait mode. In an embodiment, the first condition may refer to a default state of the electronic device 400. In this case, if the context information does not satisfy at least one of the constraints stored in the electronic device 400, this may be considered as indicating that the first condition is satisfied.

When the context information corresponds to the first condition, the processor 410 may provide to the display 440, at step 720, a first image corresponding to the biometric authentication and acquired by the first camera 420. According to an embodiment, the first image may be displayed on at least a portion of the display 440. In addition, the biometric authentication guidance may be overlapped on the first image, and the user may perform the biometric authentication by using the first image and the biometric authentication guidance.

When the context information does not correspond to the first condition, the processor 410 may determine, at step 730, whether the context information corresponds to a second condition. The second condition may include at least one of a condition that the illuminance around the electronic device 400 satisfies a second range (e.g., a value obtained through the illuminance sensor fails to exceed a predetermined threshold), a condition that the use of the first camera 420 is disallowed according to the operation policy of the electronic device 400, and a condition that the display mode of the electronic device 400 is a landscape mode.

According to an embodiment, the condition that the use of the first camera 420 is disallowed according to the operation policy of the electronic device 400 may include a case where the operation of the first camera 420 is restricted by a security module. The security module may restrict the operation of the first camera 420 called through a certain application or other system, based on the operation policy stored in the memory 450 or an external server. When the operation of the first camera 420 is restricted by the security module, the processor 410 may determine that the context information corresponds to the second condition. The processor 410 may identify at least one application that is running in the electronic device 400. If a preview function of the first camera 420 is restricted by the identified application, the processor 410 may determine that the context information corresponds to the second condition.

In an embodiment, when a user image cannot be acquired through the first camera 420 (e.g., when it is determined that the lens of the first camera 420 is physically blocked) even though the use of the first camera 420 is allowed, the processor 410 may determine that the context information corresponds to the second condition.

When the context information corresponds to the second condition, the processor 410 may provide to the display 440, at step 740, a second image corresponding to the biometric authentication and acquired by the second camera 430. According to an embodiment, the second image may be displayed on at least a portion of the display 440. In addition, the biometric authentication guidance may be overlapped on the second image, and the user may perform the biometric authentication by using the second image and the biometric authentication guidance.

If the context information does not correspond to the second condition, the processor 410 may provide to the display 440, at step 750, a predetermined biometric authentication guidance. For example, the predetermined biometric authentication guidance may include a user interface for adjusting the direction of the electronic device 400 or adjusting a distance between the user and the electronic device 400 so that the user may perform the biometric authentication.

The predetermined biometric authentication guidance may be provided after further determining whether the context information corresponds to a third condition. For example, when the context information corresponds to the third condition, the processor 410 may provide to the display 440 the predetermined biometric authentication guidance. Otherwise (namely, if the context information does not correspond to any conditions), the processor 410 may not provide to the display 440 any user interface related to the biometric authentication. However, in this case, the processor 410 may control any other interface (e.g., a speaker or a vibration device) to induce the user's biometric authentication.

Referring to FIG. 6, after providing the biometric authentication guidance to the display 440, the processor 410 of the electronic device 400 may perform the biometric authentication by using biometric data acquired through at least one camera.

According to an embodiment, the at least one camera may include a camera capable of acquiring an image by using infrared rays. For example, this image acquired using infrared rays may contain a user's iris feature data. The iris feature data may include, for example, folds in the iris, a blood vessel pattern, a color, and the like. Further, the iris feature data may include a variation pattern of the above features according to a pupil size varying with external brightness. The processor 410 may compare a user's iris feature data acquired using infrared rays with the previously stored (i.e., preregistered) iris feature data and thereby confirm whether the user is an authenticated user.

Figure 8:
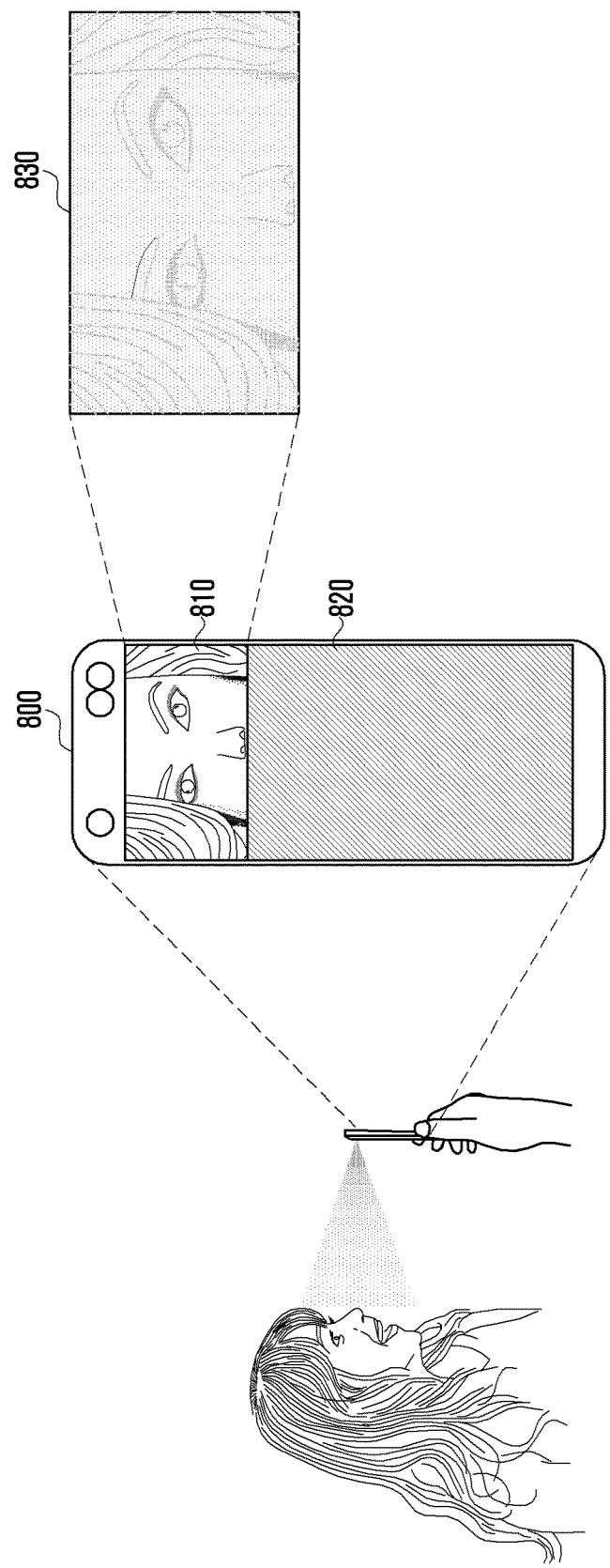
FIG. 8 is an illustration of an electronic device in a low illuminance environment according to an embodiment.

FIG. 8 is an illustration of an electronic device 800 in a low illuminance environment according to an embodiment.

Referring to FIG. 8, a processor of the electronic device 800 may identify context information associated with the electronic device 800, especially, an ambient environment of the electronic device 800. For example, the electronic device 800 may detect the illuminance around the electronic device 800 and, when the detected illuminance satisfies a first range (e.g., a value obtained through the illuminance sensor exceeds a predetermined threshold), determine that the context information corresponds to the above-described first condition. In contrast, when the detected illuminance satisfies a second range (e.g., a value obtained through the illuminance sensor fails to exceed a predetermined threshold), the electronic device 800 may determine that the context information corresponds to the above-described second condition.

According to an embodiment, when the detected illuminance satisfies the first range, the electronic device 800 may further determine whether the detected illuminance indicates a low illuminance environment, a middle illuminance environment, or a high illuminance environment. For example, when the electronic device 800 provides a first image corresponding to biometric authentication and obtained using the first camera to the display because the detected illuminance satisfies the first range, the color of the first image on the display may be varied depending on the detected illuminance. Therefore, it may be necessary to check whether the illuminance around the electronic device 800 indicates a low illuminance environment, a middle illuminance environment, or a high illuminance environment.

According to an embodiment, the electronic device 800 may determine the illuminance environment by using the illuminance sensor mounted in the electronic device 800. For example, if the value obtained through the illuminance sensor exceeds the predetermined threshold (i.e., satisfying the first range) and is also less than a first certain value within the first range, this may indicate the low illuminance environment. If the value obtained through the illuminance sensor exceeds the predetermined threshold and is between the first certain value and a second certain value within the first range, this may indicate the middle illuminance environment. If the value obtained through the illuminance sensor exceeds the predetermined threshold and is greater than the second certain value within the first range, this may indicate the high illuminance environment.

In an embodiment, the electronic device 800 may detect the illuminance around the electronic device 800 through a process of acquiring image data from at least one camera and analyzing the acquired image data. For example, based on at least one of a measured brightness value (BV) for automatic exposure adjustment, an image histogram distribution for automatic exposure adjustment, and camera parameters (e.g., International Standards Organization (ISO) value, exposure time) determined as a result of automatic exposure adjustment, the electronic device 800 may determine the illuminance around the electronic device 800. For example, if a BV value is 0 or less, lesser values in the histogram take a large proportion, an ISO value is 1000 or more, and the exposure time is ½ second or less, the illuminance around the electronic device 800 may be determined as the low illuminance environment.

An example shown in FIG. 8 shows a case where the illuminance around the electronic device 800 satisfies the first range and also indicates the low illuminance environment. For example, if it is determined that the illuminance around the electronic device 800 satisfies the first range, the electronic device 800 may display an image, acquired by the first camera, on a first area 810 that is distinguished from a second area 820. In addition, when the lighting module emits light in the infrared wavelength range, the red visible light wavelength range close to the infrared wavelength range may be emitted together, then be reflected by the user, and affect the image acquired by the first camera. In particular, since the effect of the red visible light wavelength range on an image is considerable in a low illuminance environment, a user image displayed on the first area 810 may be more reddish as indicated by reference numeral 830.

Figure 9:
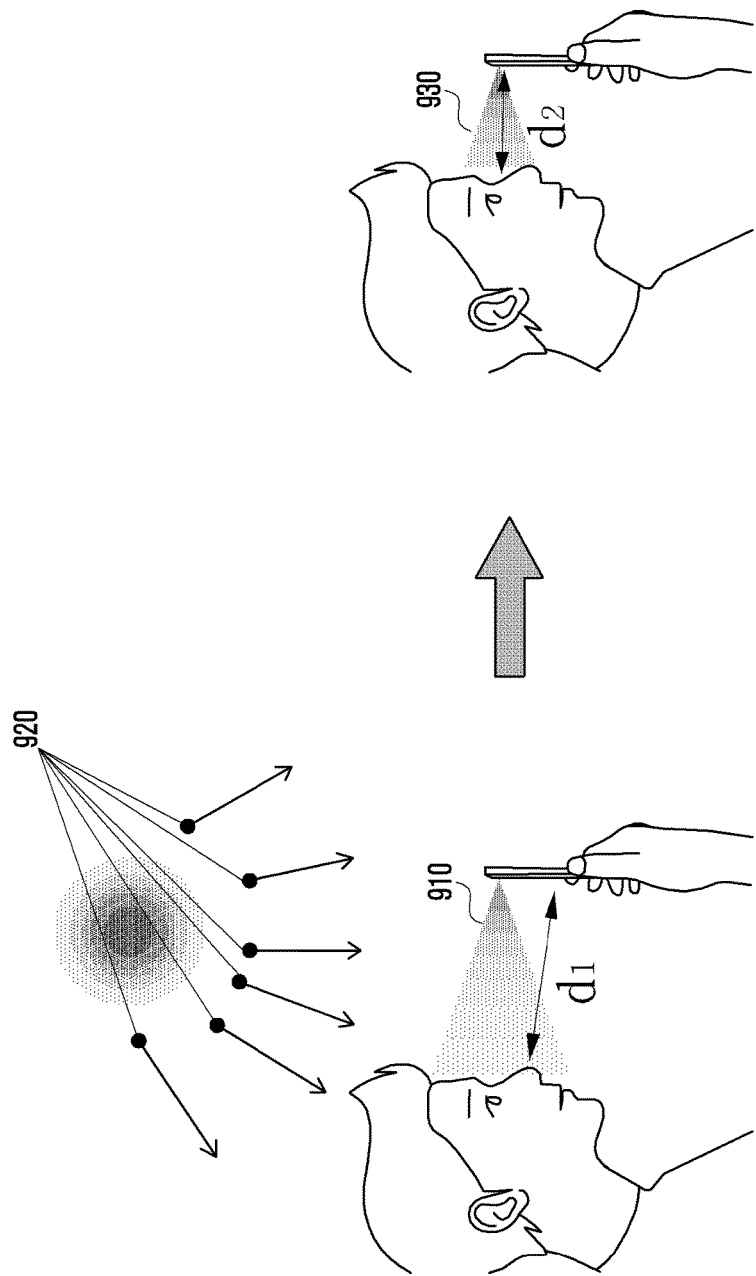
FIGS. 9, 10, and 11 are illustrations of a method of correcting color of an image provided through a display by an electronic device according to an embodiment.
Figure 10:
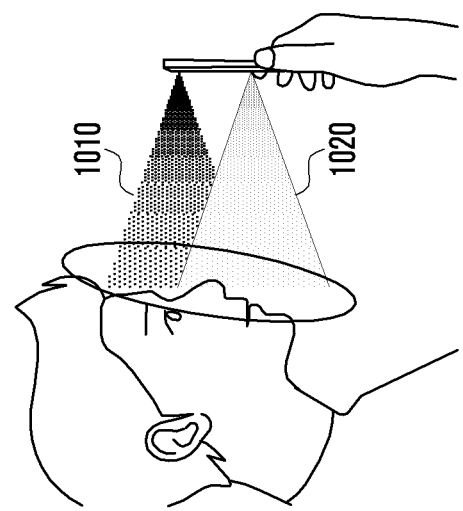
Figure 10:
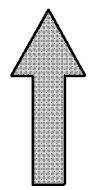
Figure 10:
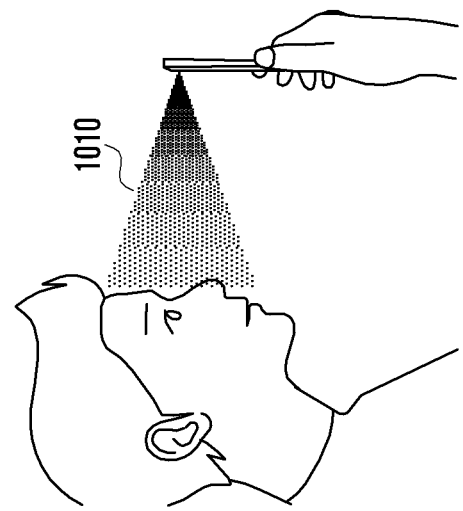
Figure 11:
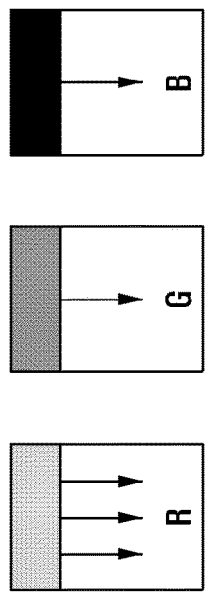
Figure 11:
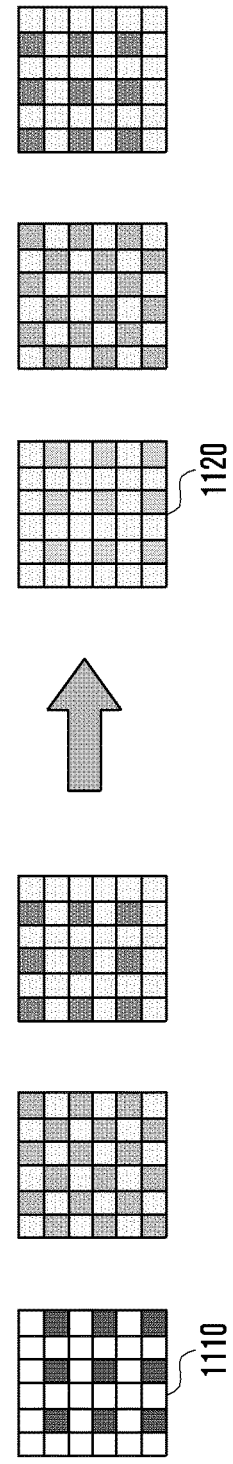

FIGS. 9 to 11 are illustrations of a method of correcting color of an image provided through a display by an electronic device according to an embodiment.

According to an embodiment, when context information corresponds to a first condition, the processor 410 of the electronic device 400 may provide to the display 440 a first image corresponding to biometric authentication and acquired using the first camera 420.

According to an embodiment, the electronic device 400 may include the lighting module 460, and the processor 410 of the electronic device 400 may be configured to correct at least a portion of the first image, based on the characteristics of the lighting module 460. For example, if the lighting module 460 has the characteristics of emitting light in the infrared wavelength range, the processor 410 may correct at least a portion of a red part of the acquired first image.

According to an embodiment, the processor 410 of the electronic device 400 may be configured to correct at least a portion of the first image, at least based on the context information. For example, if it is determined that the electronic device 400 is in a low illuminance environment, and if the intensity of the ambient infrared rays is great, the processor 410 may correct at least a portion of a red part of the acquired first image.

Referring to FIG. 9, the processor 410 of the electronic device 400 may identify an intensity of ambient infrared rays 920 and/or a first distance (d1) between the electronic device and the user, based on the acquired context information, and then display a suitable guidance for adjusting the light emission intensity of the lighting module 460 and/or adjusting the distance between the electronic device and the user.

According to an embodiment, using infrared ray detection values of at least one of the illuminance sensor, the proximity sensor, the biometric sensor, and the second camera, the processor 410 of the electronic device 400 may identify the intensity of ambient infrared rays 920 (e.g., infrared rays within the natural light of the sun) in a state where the lighting module does not emit the infrared rays. Using at least one of a face detection algorithm (e.g., face size detection) and the proximity sensor, the processor 410 of the electronic device 400 may identify the first distance (d1) between the electronic device and the user.

According to an embodiment, the processor 410 of the electronic device 400 may perform at least one of an operation of adjusting the intensity of the lighting module 460, based on the intensity of the ambient infrared rays 920 and/or the first distance (d1) between the electronic device and the user, and an operation of providing a suitable guidance for adjusting the distance between the electronic device and the user to the display. For example, the processor 410 may emit light by adjusting the first light emission intensity 910 of the lighting module 460 to the second light emission intensity 930, or display a suitable guidance for leading the user to adjust the first distance (d1) between the electronic device and the user to the second distance (d2).

According to an embodiment, the user may be located in a low illuminance environment even though the intensity of the infrared rays 920 is great. In this case, if the lighting module 460 emits the infrared rays with the first light emission intensity 910, a user image acquired from the first camera 420 may be a reddish color. Thus, the processor 410 of the electronic device 400 may adjust the intensity of the lighting module 460 or display a suitable guidance for adjusting the distance between the electronic device and the user in order to prevent the displayed user image from being a reddish color.

Referring to FIG. 10, the processor 410 of the electronic device 400 may correct at least a portion of the first image by using a color of a certain wavelength range displayed on at least a portion of the display 440.

According to an embodiment, when it is identified that the electronic device 400 is in a low illuminance environment, the processor 410 of the electronic device 400 may display through at least a portion of the display 440 a color representing a certain wavelength range, based on the intensity of light emitted by the lighting module 460. For example, the processor 410 may identify a light emission intensity 1010 of the lighting module 460 on the basis of the amount of current applied to the lighting module 460, and display through at least a portion of the display 440 a color 1020 corresponding to a certain wavelength range (e.g., green and/or blue wavelength range) to be reflected by the user. The red light emitted from the lighting module 460 may undergo destructive interference with the green and/or blue light emitted from the display 440. Therefore, the first image acquired by the first camera 420 may have evenly distributed red, green, and blue light so that the user image displayed on the display 440 may be prevented from being a reddish color.

Referring to FIG. 11, the processor 410 of the electronic device 400 may be configured to correct at least a portion of the first image, based on data acquired by selectively filtering the values of at least some pixels of the first camera 420.

According to an embodiment, the first camera 420 may generate electrical signals in response to red (R), green (G), and blue (B) light sources pixel by pixel (e.g., a Bayer sensor). For example, the processor 410 may correct at least a portion of the first image, based on data acquired by selectively filtering the values of at least some pixels (e.g., red) of the first camera 420.

For example, if the lighting module 460 emits red light in a low illuminance environment, the red wavelength range is excessively incident upon the red pixels of the first camera 420 and, as a result, the first image 1110 tinged with red may be acquired. Considering this, the processor 410 or the first camera 420 may selectively filter the value of a certain pixel (e.g., a red pixel) when it is identified that the lighting module 460 emits red light in a low illuminance environment. For example, the processor 410 may lower the photoelectric conversion efficiency by reducing the gain of an analog-to-digital converter (ADC) for a red pixel in the image sensor of the first camera 420. According to an embodiment, the processor 410 may selectively filter the value of a red pixel by lowering data of a red channel in digitized image data (e.g., Bayer raw image) after an ADC operation. By obtaining the first image 1120 with red filtered, the processor 410 may prevent the user image displayed on the display 440 from being a reddish color.

According to an embodiment, the processor 410 of the electronic device 400 may correct at least a portion of the first image by adjusting an interpolation ratio of at least some pixels of the first image. For example, if the lighting module 460 emits red light in a low illuminance environment, the processor 410 may consider that the ratio of red pixels may be abnormally high, and then adjust the ratio of red pixels when white balance (WB) is applied to an image acquired from the first camera 420. For example, if the interpolation ratio of pixels is R:G:B=4:3:2 in the case of applying WB, the processor 410 may adjust the interpolation ratio of pixels to R:G:B=1:3:2 in a low illuminance environment in order to prevent the user image displayed on the display 440 from being a reddish color.

According to an embodiment, the processor 410 of the electronic device 400 may control the display 440 to correct at least a portion of the first image by adjusting the current value of a certain pixel. For example, if the lighting module 460 emits red light in a low illuminance environment, the processor 410 may consider that the ratio of red pixels may be abnormally high, and then control the display 440 displaying the first image to adjust the current value of a certain pixel (e.g., a red pixel) according to a certain ratio. Through this, the processor 410 may prevent the user image displayed on the display 440 from being a reddish color.

Figure 12:
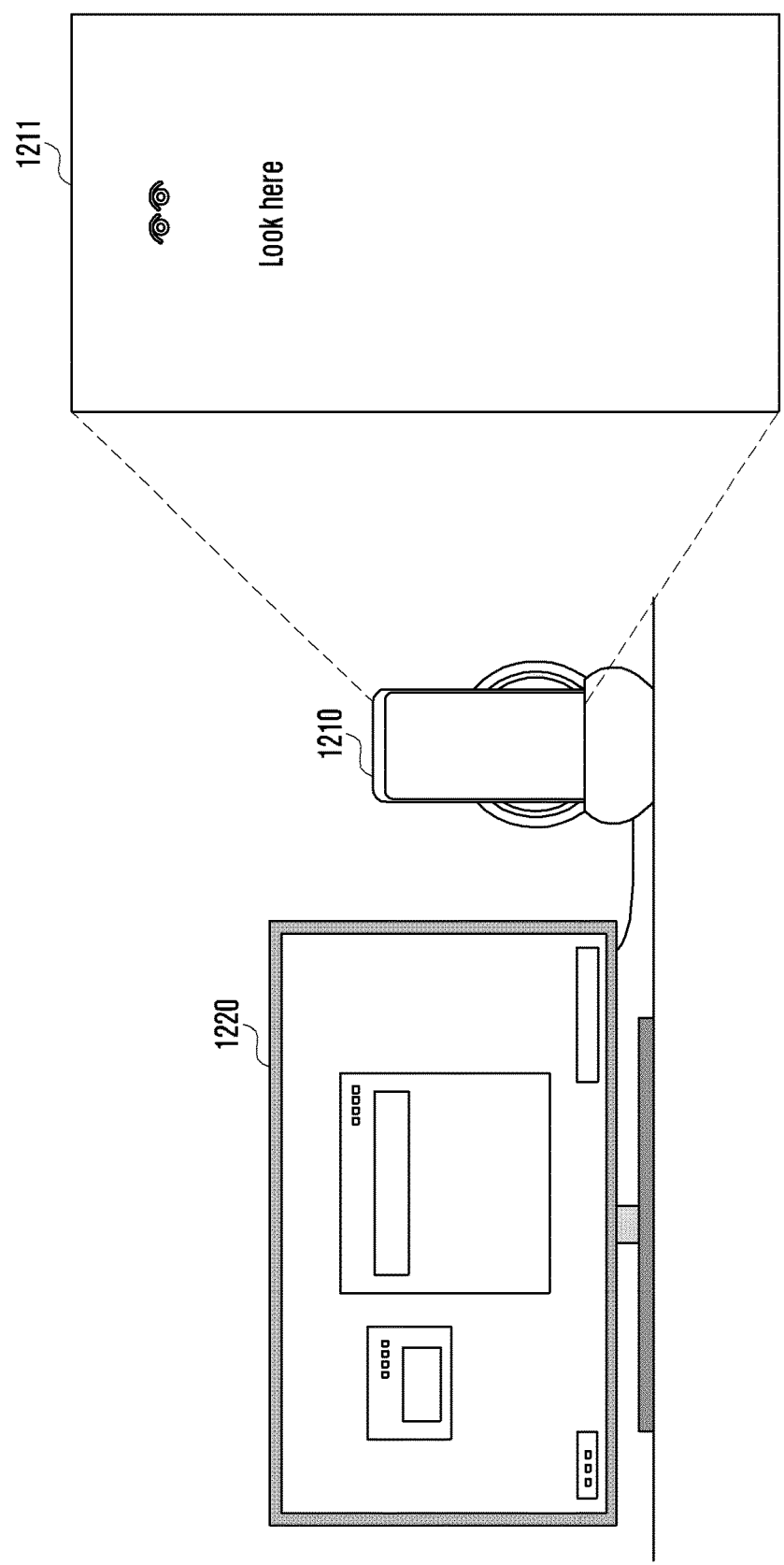
FIG. 12 is an illustration of an electronic device and at least one external electronic device according to an embodiment.

FIG. 12 is an illustration of an electronic device 1210 and at least one external electronic device 1220 according to an embodiment.

Referring to FIG. 12, the electronic device 1210 may be coupled to the at least one external electronic device 1220. The electronic device 1210 may share at least a portion of a screen with the at least one external electronic device 1220 connected thereto. For example, the electronic device 1210 may identify the attributes (e.g., resolution, aspect ratio, or display orientation) of the external electronic device 1220 and then determine a display mode. For example, when the attributes of the external electronic device 1220 are suitable for a landscape mode (e.g., when the resolution is 1920× 1080), the electronic device 1210 may determine the display mode as the landscape mode.

According to an embodiment, while sharing at least a portion of a screen with the at least one external electronic device 1220, the electronic device 1210 may receive a request associated with biometric authentication for the user. Then, the electronic device 1210 may identify context information (e.g., a display mode) associated with the electronic device 1210 and provide biometric authentication guidance corresponding to the identified context information to the display. For example, when it is determined that the context information corresponds to the above-mentioned third condition (e.g., when the display mode corresponds to the landscape mode), the electronic device 1210 may display predetermined biometric authentication guidance 1211 on the display. If it is determined that there is no condition (e.g., the above-mentioned first, second, or third condition) corresponding to the context information, the electronic device 120 may not provide any user interface related to biometric authentication to the display. However, in this case, the processor of the electronic device 1210 may control another interface (e.g., a speaker or a vibration device) to induce the user's biometric authentication.

The embodiments of the present disclosure are merely provided to assist in a comprehensive understanding of the present disclosure and are not suggestive of limitation. Therefore, it should be understood that many variations and modifications of the present disclosure described herein may fall within the scope of the present disclosure as defined by the appended claims and their equivalents.

What is claimed is:

1. An electronic device, comprising:
    a first camera configured to acquire an image through visible light;
    a second camera configured to acquire an image through infrared rays;
    a display;
    a memory; and
    a processor configured to:
        receive a request associated with biometric authentication for a user,
        in response to the request, identify context information associated with the electronic device,
        when the context information corresponds to a first condition, provide to the display a first image corresponding to the biometric authentication and acquired by the first camera, and perform the biometric authentication using biometric data acquired from the second camera, and
        when the context information corresponds to a second condition, provide to the display a second image corresponding to the biometric authentication and acquired by the second camera, and perform the biometric authentication using biometric data acquired from the second camera.

2. The electronic device of claim 1, wherein the processor is further configured to:
    identify iris feature data from the biometric data, and
    perform the biometric authentication, based on a comparison of the identified iris feature data with preregistered iris feature data stored in the memory.

3. The electronic device of claim 1, further comprising:
    a lighting module,
    wherein the processor is further configured to correct at least a portion of the first image, based on characteristics of the lighting module.

4. The electronic device of claim 1, wherein the processor is further configured to correct at least a portion of the first image, at least based on the context information.

5. The electronic device of claim 1, wherein the processor is further configured to correct at least a portion of the first image by using a color of a certain wavelength range displayed on at least a portion of the display.

6. The electronic device of claim 1, wherein the processor is further configured to correct at least a portion of the first image, based on data acquired by selectively filtering values of at least some pixels of the first camera.

7. The electronic device of claim 1, wherein the processor is further configured to correct at least a portion of the first image by adjusting an interpolation ratio of at least some pixels of the first image.

8. The electronic device of claim 1, wherein the processor is further configured to control the display to correct at least a portion of the first image by adjusting a current value of a certain pixel.

9. The electronic device of claim 1, wherein the processor is further configured to:
    detect illuminance around the electronic device,
    when the detected illuminance satisfies a first range, determine that the context information corresponds to the first condition, and
    when the detected illuminance satisfies a second range, determine that the context information corresponds to the second condition.

10. The electronic device of claim 1, wherein the processor is further configured to:
    identify at least one application that is running in the electronic device, and
    when a preview function of the first camera is restricted by the identified application, determine that the context information corresponds to the second condition.

11. The electronic device of claim 1, wherein the processor is further configured to, when the context information corresponds to a third condition, provide predetermined biometric authentication guidance to the display, and perform the biometric authentication using biometric data acquired from the second camera.

12. The electronic device of claim 11, wherein the processor is further configured to:
   identify an external electronic device with which the electronic device shares at least a portion of a screen, and
   identify the context information, based on a display mode of the screen.

13. A method of recognizing biometric data at an electronic device including a first camera configured to acquire an image through visible light and a second camera configured to acquire an image through infrared rays, comprising:
   receiving a request associated with biometric authentication for a user;
   in response to the request, identifying context information associated with the electronic device;
   when the context information corresponds to a first condition, providing to a display of the electronic device a first image corresponding to the biometric authentication and acquired by the first camera, and performing the biometric authentication using biometric data acquired from the second camera; and
   when the context information corresponds to a second condition, providing to the display a second image corresponding to the biometric authentication and acquired by the second camera, and performing the biometric authentication using biometric data acquired from the second camera.

14. The method of claim 13, further comprising:
   identifying iris feature data from the biometric data; and
   performing the biometric authentication, based on a comparison of the identified iris feature data with preregistered iris feature data stored in the memory.

15. The method of claim 13, further comprising:
   correcting at least a portion of the first image, based on characteristics of a lighting module of the electronic device.

16. The method of claim 13, further comprising:
   correcting at least a portion of the first image, at least based on the context information.

17. The method of claim 13, further comprising:
   detecting illuminance around the electronic device;
   when the detected illuminance satisfies a first range, determining that the context information corresponds to the first condition; and
   when the detected illuminance satisfies a second range, determining that the context information corresponds to the second condition.

18. The method of claim 13, further comprising:
   identifying at least one application that is running in the electronic device; and
   when a preview function of the first camera is restricted by the identified application, determining that the context information corresponds to the second condition.

19. The method of claim 13, further comprising:
   when the context information corresponds to a third condition, providing to the display predetermined biometric authentication guidance, and performing the biometric authentication using biometric data acquired from the second camera.

20. The method of claim 19, further comprising:
   identifying an external electronic device with which the electronic device shares at least a portion of a screen; and
   identifying the context information, based on a display mode of the screen.

* * * * *